Figure 1:
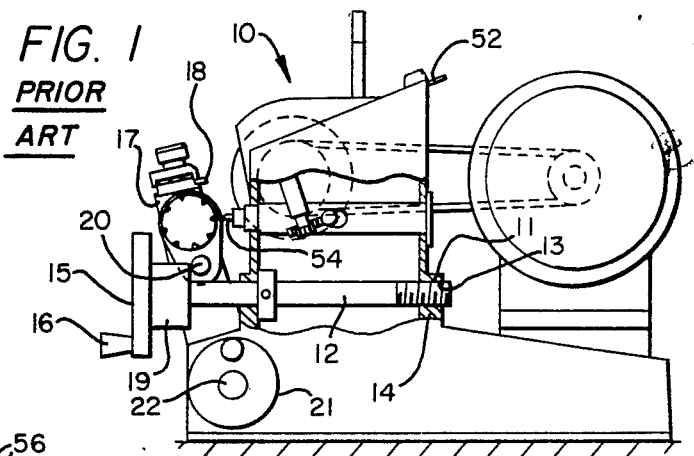

United States Patent [19]

Womack

[11] Patent Number: 4,971,489
[45] Date of Patent: Nov. 20, 1990

[54] CODE KEY CUTTING MACHINE FAST CAM FEED

[76] Inventor: Robert C. Womack, Dallas, Tex.

[21] Appl. No.: 465,380

[22] Filed: Jan. 16, 1990

[51] Int. Cl.$^5$ .............................................. B23C 3/35
[52] U.S. Cl. ...................................... 409/81; 76/110; 409/82
[58] Field of Search ................................... 409/81–83, 409/87, 145, 162; 51/165.78, 165.89; 76/110; 33/539, 836

[56] References Cited

U.S. PATENT DOCUMENTS 1,750,218   3/1930   Falk ......................................... 409/81
4,090,303   5/1978   Uyeda ..................................... 409/81
4,117,763  10/1978   Uyeda ..................................... 409/82

Primary Examiner—Steven C. Bishop

[57] ABSTRACT

A cam feed attachment and a quick space attachment for a code key and key card coded cutting machine enabling a fifty percent time saving in cutting code or master keys with much less effort and with as high a degree of precision. A thread advancing key moving shaft, collar and turn wheel assembly is replaced by a rotational shaft mounting a compound quick action cam manually rotated by a lever mounted on an adjustably position locked cap. The compound quick action cam key moving assembly quickly moves the key clamp vise from the retracted position where the key is clamped in the advanceable machine key vise to a shallow cam drive portion for manual key advancement for key notch cutting to specific card indicated key notch depth cuttings. The pivotally mounted advanceable machine key vise member is extended through a double range where one or the other of two cam sides of the shallow cam drive portion may be used with the manual rotational direction of control reversed one from the other. The cam feed is a constant rate cam that uses less than one sixth of a revolution in the key cutting cycle from the start of the most shallow cut to the full depth of the deepest cut. The machine is further altered by replacing a hand crank wheel key notch cut positioner with a belt and pulley structure requiring crank drive of only two and one half turns in place of ten turns.

19 Claims, 3 Drawing Sheets

CODE KEY CUTTING MACHINE FAST CAM FEED

This invention relates in general to code key cutting machines, and more particularly, to a cam feed implementation that, coupled with a quick space setting addition, enables a fifty percent or better time saving in cutting code or master keys.

There are basic code key cutting machines in existence, running to thousands of machines, and on the market such as typified by U.S. Pat. Nos. 4,090,303 and 4,117,763, Tim M. Vyeda, inventor, titled respectively, "Key Decoding Apparatus" and "Key Decoding and Duplicating Apparatus and Method". Such machines are good basic high precision machines with the screw feed with hand wheel and knob requiring approximately ten turns of the hand wheel crank to move the key clamp vise from the key blank insertion and clamping position to the deepest cut for a given key. The basic machine also has a hand crank feed wheel for spacing of key notch cuts through the range of key notch settings through which it is necessary to turn the hand crank from five to ten turns. These time consuming machine setting steps are not bad from a time standpoint if one is cutting just a few keys a day. However, if many keys are to be cut time requirements imposed can, in the cumulative sense, make the job not only time consuming but tedious in the process. It is highly desirable to so modify (or convert) a basic code key cutting machine such as to greatly reduce the time required for such adjustment steps while at the same time preserve the excellent machine precision of the basic machine. Further, it is important that such modification conversions be possible in minimum time without alteration of the basic machine other than removal of the hand wheel and hand wheel screw and replacement thereof with a positioning cam, cam shaft and manual positioning lever. With respect to lateral positioning of a key blank for spacing of key notch cuts the alteration calls for removal of a hand crank wheel and installation of a pulley system having a four to one drive ratio drive advantage. The machine can be simply and easily put back in original factory shape and operating condition by removing the cam feed attachment and reinstalling the original hand wheel and screw feed shaft, and with respect to transverse positioning of a key blank for key notch cuts the pulley system is removed and the hand crank wheel reinstalled. It is possible that with some unaltered key cutting machines an operator can accidentally run the key vise body into the cutting wheel, an operational hazard that should be eliminated.

It is, therefore, a principal object of this invention to provide with conversion of a basic code key cutting machine time savings in cutting code or master keys running to over fifty percent.

Another object with such key cutting machine conversion is to require much less effort in cutting code or master keys.

A further object is to preserve and actually improve precision standards in cutting code or master keys.

Still another object is to provide for basic key cutting machine alterations without any machining of the basic machine that are easily and quickly installed and removed for returning a machine to its original from the factory condition.

Features of the invention useful in accomplishing the above objects include, in a code key cutting machine fast cam feed and key notch cut transverse positioning belt and pulley conversion, a cam feed attachment and a quick space attachment for a code key and key card coded cutting machine enabling a fifty percent time saving in cutting code or master keys with much less effort and with as high a degree of precision. A thread advancing key moving shaft, collar and turn wheel assembly is replaced by a rotational shaft mounting a compound quick action cam manually rotated by a lever mounted on an adjustably position locked cap. The thread advancing key moving assembly quickly moves the key clamp vise from the retracted position where the key is clamped in the advanceable machine key vise to a shallow cam drive portion for manual key advancement for key notch cutting to specific card indicated key notch depth cuttings. The pivotally mounted advanceable machine key vise member is extended through a double range where one or the other of two cam sides of the shallow cam drive portion may be used with the manual rotational direction of control reversed one from the other. The cam feed is a constant rate cam that uses less than one sixth of a revolution in the key cutting cycle from the start of the most shallow cut to the full depth of the deepest cut. The machine is further altered by replacing a hand crank wheel key notch cut positioner with a belt and pulley structure requiring crank drive of only two and one half turns in place of ten turns.

A specific embodiment representing what is presently regarded as the best mode of carrying out the invention is illustrated in the accompanying drawings.

Figure 2:
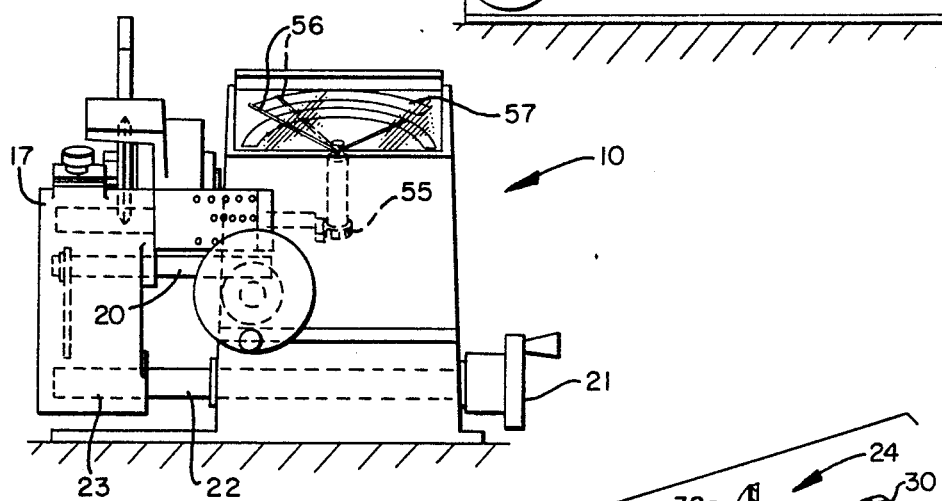
Figure 7:
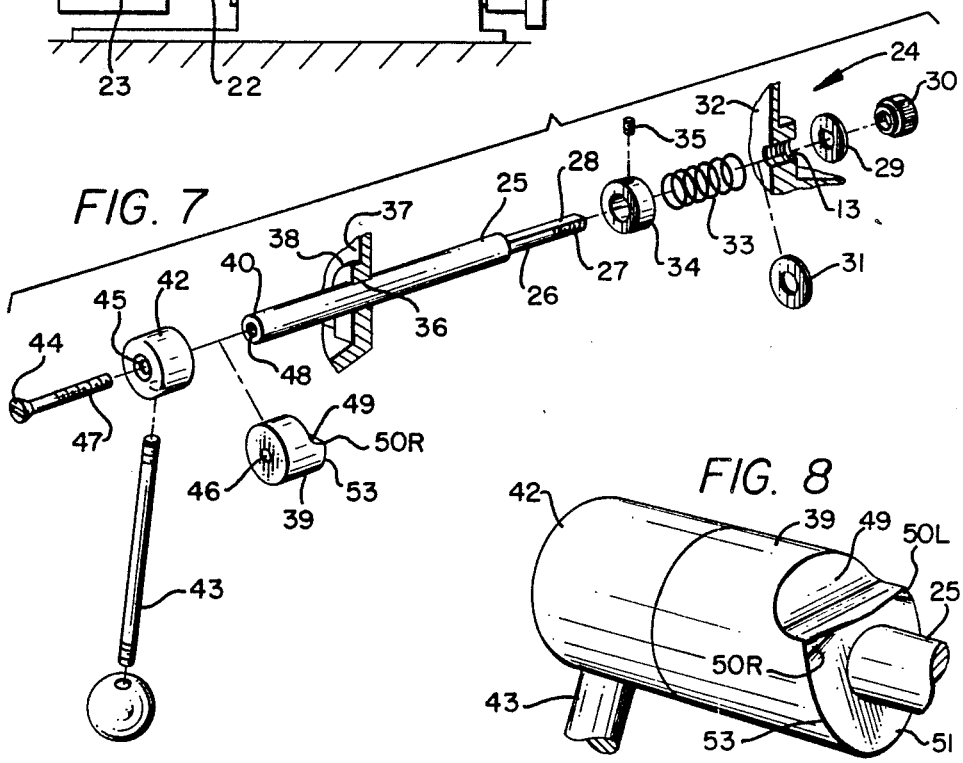
Figure 8:
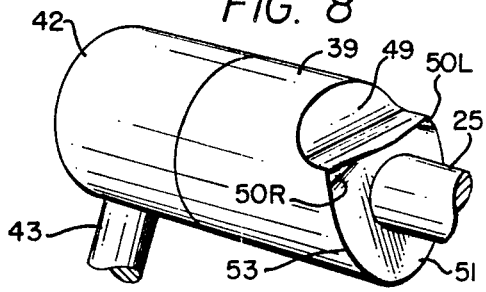
Figure 3:
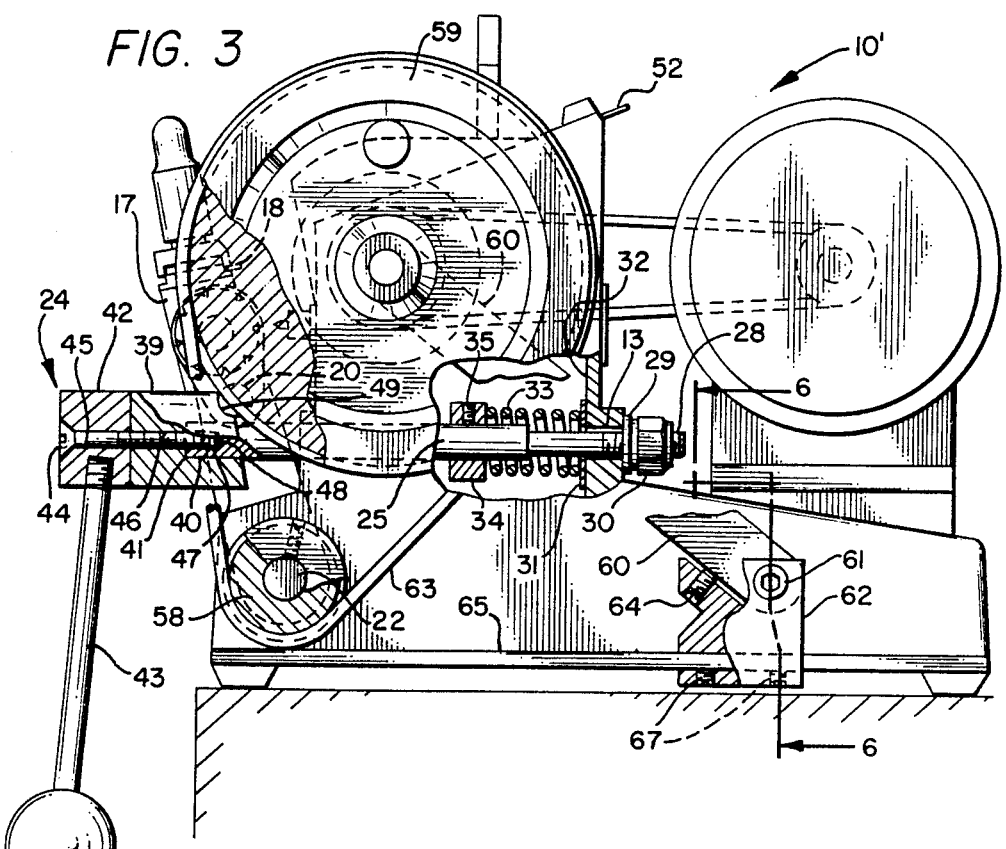
Figure 4:
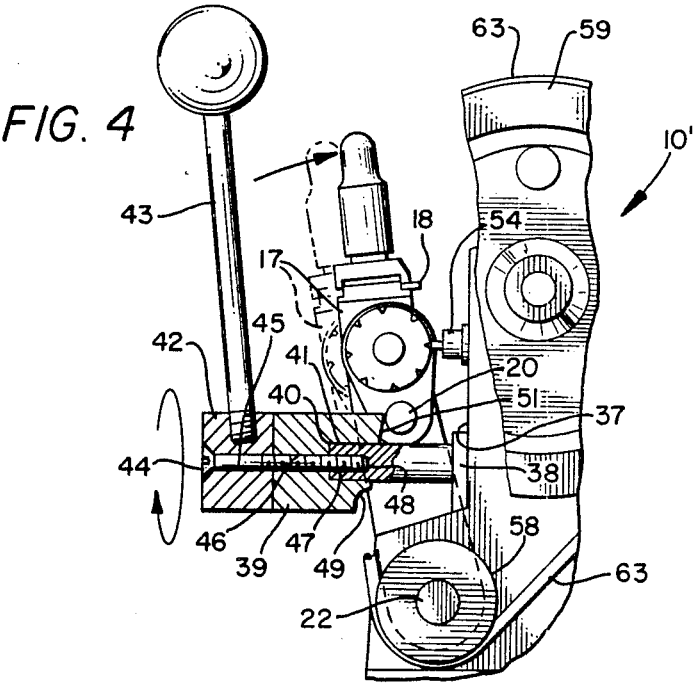
Figure 5:
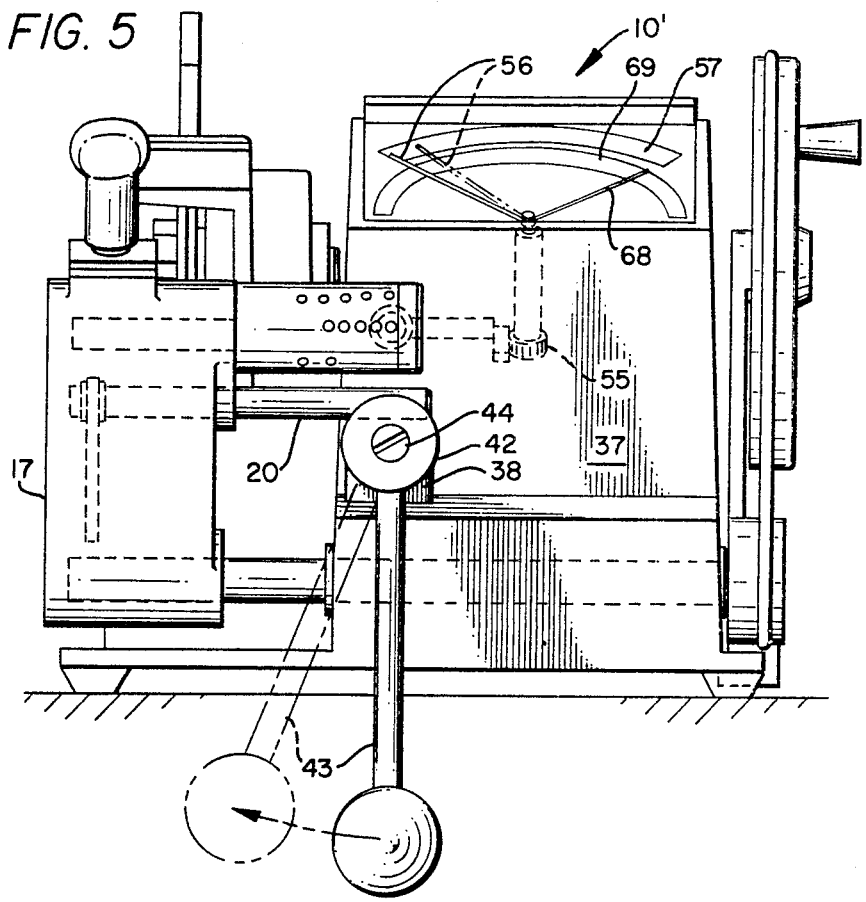
Figure 6:
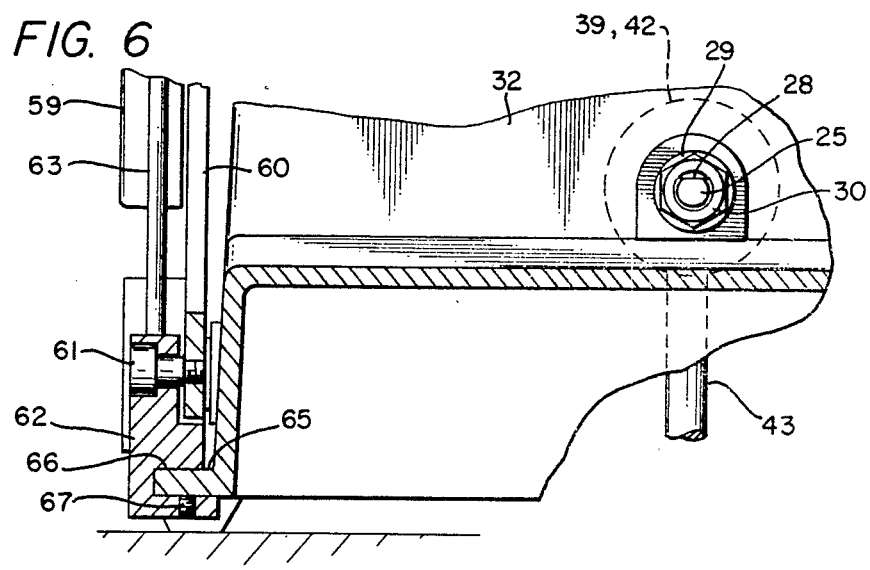

In the drawings:

FIG. 1 represents a side elevation view of a prior art code key cutting machine;

FIG. 2, a front operator facing elevation view of the prior art code key cutting machine of FIG. 1;

FIG. 3, a partially cut away and sectioned code key cutting machine including a cam feed rotatable shaft mounting the compound quick action cam that advances and permits return of the key mounting pivotal advanceable key vise member by movement of a manually rotated lever and with the key notch transverse positioning belt and pulley conversion in place;

FIG. 4, a partially cut away and sectioned side elevation view of the code key cutting machine of FIG. 3 with the key mounting pivotal advanceable key vise member pivoted forward to the deepest key notch cutting state by the constant rate cam key cutting phase portion of the compound cam;

FIG. 5, a front operator facing elevation view, like FIG. 2, of a converted code key cutting machine;

FIG. 6, a partial detail view taken along line 6-6 of FIG. 3 showing machine modification mounting detail;

FIG. 7, an exploded perspective view of the compound quick action cam, the cam shaft assembly and the manual cam lever mountable on an adjustable rotation position cap; and FIG. 8, a perspective view of the compound cam and cap with the lever as assembled on the cam shaft.

Referring to the drawings:

The prior art code key cutting machine 10 of FIGS. 1 and 2 is shown to have a screw thread 11 advanced and returned shaft 12 with the screw threads 11 working in threads 13 of machine housing 14. Shaft 12 mounts a hand wheel 15 and knob 16 that requires approximately ten turns of the hand wheel 15 to move the pivotally mounted key clamp vise member 17 from the retracted state of FIG. 1 to the deepest cut in a given key blank 18. Shaft 12 mounts a sleeve member 19 fixed to the shaft that moves bar 20 and thereby the clamp vise portion through the range of pivotal movement required. The code key cutting machine 10 as it comes standard as shown in FIGS. 1 and 2 has a hand crank feed wheel 21 mounted on shaft 22 that has a threaded portion 23 that can in rotational action with threads of the clamp vise portion move the clamp vise portion transversely back and forth. This moves the clamp vise portion for the cross spacing of the cuts in a lock key blank 18 with, to cover the distance of travel on most keys cut, it being necessary to turn the hand crank feed wheel 21 from five to ten times.

Referring now to FIGS. 3–8 a cam feed assembly 24 is shown that substituted in code key cutting machine 10' for the screw thread 11 advanced and returned shaft 12 with hand wheel 15 and knob 16 and sleeve member 19 assembly used in the code key cutting machine 10' of FIGS. 1 and 2. The cam feed assembly 24 includes a rototably mounted shaft 25 with a shank 26 that is a rotatable fit within threads 13 of a threaded opening in machine housing 14. The shank 26 and the threaded end portion 27 thereof are flattened 28 on one side to accomodate anti-rotation D-washer 29 to prevent relative rotative loosening of shaft retaining end nut 30. A washer 31 is resiliently biased against machine housing wall 32 by coil spring 33 restrained at the other end by shaft sleeve 34 locked in place on the shaft 25 by set screw 35. Shaft 25 extends through and is a rotatable fit in opening 36 of housing wall 37 boss 38 and on out to mount compound cam member 39 with the shaft end 40 a tight fit in cam member opening 41. A cap 42 mounting manual lever 43 is adjustably fastened in place with screw 44 extended through cap opening 45 and opening 46 in cam member 39 to threaded 47 insertion in shaft threaded opening 48. The compound cam member 39 has a cut back cam portion 49 that permits the rod 20 and the key clamp vise member 17 to be in the retracted position when the compound cam 39 is in the rotated alignment therefore. Each end of the cut back cam portion 49 blends into fast climb cam surfaces 50L and 50R that lead to shallow angled cam drive portion 51 for rod 20 as the lever 43 and compound cam member 39 is rotated one way or the other. This provides for manual key advancement for key notch cutting to specific card 52 indicated key notch cuttings. The pivotally mounted advanceable machine key vise member is extended through a double range where one or the other of two cam sides of the shallow cam drive portion may be used with the manual rotational direction of control reversed one from the other. The cam feed is a constant rate cam that uses less than one sixth of a revolution in the key cutting cycle from the start of the most shallow cut to the full depth of the fullest cut. Other than when bar 20 is seated in cut back cam portion 49 with the key clamp vise member 17 in the retracted position or engaging fast climb cam surfaces 50L and 50R the bar 20 rides along the peripheral edge 53 of the shallow angled cam drive portion 51. This positions the key clamp vise member 17 to different key blank 18 notch cutting positions indication translated via position follower 54 and interconnect drive structure 55 to drive needle 56 to different cut deph indications over scale band 57.

Lateral positioning of a key blank for spacing of key notch cuts includes additional alteration including removal of a hand crank wheel and installation of a pulley and belt system having a four to one drive advantage. This requires replacing the hand wheel 21 of FIGS. 1 and 4 with a pulley 58 mounted on shaft 22. A larger pulley 59 giving a four to one ratio driving advantage is mounted on the upper end of an arm 60 pivotally mounted by rotation pin 61 in mounting bracket 62 with belt 63 tensioning adjustment screw 64 adjusting belt tension. The pulley 59 mounting bracket 62 is fixed in place on machine flange 65, with the flange seated in bracket slot 66, by set screws 67. The pulley 59 is mounted such that an operator can conveniently grasp it and easily move the transverse drive from one setting to another with a belt and pulley structure requiring two and one half turns in place of ten turns to position settings as translated to needle 68 position needle settings on scale 69.

The machine can be simply and easily put back in original factory shape and operating condition by removing the cam feed attachment and reinstalling the original hand wheel and screw feed shaft, and with respect to transverse positioning of a key blank for key notch cuts the pulley system is removed and the hand crank wheel reinstalled. It is possible that with some unaltered key cutting machines an operator can accidentally run the key vise body into the cutting wheel, an operational hazard that should be eliminated.

Whereas this invention has been described with respect to a single embodiment thereof it should be realized that various changes may be made without departure from the essential contributions to the art made by the teachings hereof.

I claim:

1. A fast cam feed for a code key cutting machine comprising: a code key cutting machine with key card coded cutting of code and master keys; a rotational shaft; a compound quick action cam mountable on said shaft; a lever for manually rotating said compound quick action cam and the shaft it is mounted on; a key clamp vise pivotally mounted in said code key cutting machine moveable from a retracted position where the key blank is clamped in the key clamp vise to a shallow cam driven range for manual key blank advancement through a range of key notch cuttings to specific card indicated key notch depth cuttings; said key clamp vise having a cam engaging member; and said compound cam having a retracted position holding said cam engaging member and opposite side quick rise cam portions and a shallow cam drive portion extended between said opposite side quick rise cam portions for driving said key clamp vise through the range of key notch cuttings to specific card indicated key notch depth cuttings.

2. The fast cam feed of claim 1, wherein a cap member is mounted together with said compound quick action cam on said shaft by mounting means extended through both said cap member and said compound quick action cam and into said shaft; said lever is mounted in said cap member; and with said cap member and said lever being rotationally adjustable between left and right hand manual caming action positions by loosening said mounting means and retightening said mounting means with the cap member and lever in the desired rotational position relative to said compound quick action cam.

3. The fast cam feed of claim 2, wherein said mounting means is a screw extended through both said cap member and said compound quick action cam and threaded into a threaded opening in said shaft.

4. The fast cam feed of claim 3, wherein said cam engaging member is a cylindrical rod extension from said key clamp vise.

5. The fast cam feed of claim 4, wherein the retracted position of said compound cam is in part surface conformed to the shape of said cylindrical rod extension that is said cam engaging member.

6. The fast cam feed of claim 5, wherein said opposite side quick vise cam portions include steep angled cam surfaces engageable with said cylindrical rod extension one of which engages and lifts said cylindrical rod extension in transition from being seated in the retracted position state of said compound cam to engagement with said shallow cam drive portion of said compound cam with rotation of said compound cam.

7. The fast cam feed of claim 6, wherein said cylindrical rod extension rides along the peripheral edge of said shallow cam drive portion through the extent of drive of said key clamp vise through the range of key notch cuttings to specific card indicated key notch depth cuttings from the start of the most shallow cut to the full depth of the deepest cut.

8. The fast cam feed of claim 7, wherein said shaft is rotatably mounted in said code key cutting machine in housing front and back walls; and resilient friction position holding means on said shaft engaging said back wall of said code key cutting machine.

9. The fast cam feed of claim 8, wherein said shaft resilient friction position holding means includes a sleeve locked on said shaft, a resiliently compressed coil spring, and a washer pressured by said spring against the inside of said back wall.

10. The fast cam feed of claim 9, wherein said shaft and said compound cam are adjustable to desired position by a nut on a rear thread end of said shaft.

11. The fast cam feed of claim 10, wherein said shaft is provided with a flat extending through threading on the end of said shaft; a "D" washer is mounted on said shaft between the back wall and said nut to rotate with rotation of said shaft and prevent rotational torque from being transmitted to said nut.

12. The fast cam feed of claim 10, wherein said flat is extended for a length of said shaft to the location of said sleeve locked on said shaft; and a set screw in said sleeve tightened down to locking engagement with the flat of said shaft.

13. The fast feed for a code key cutting machine of claim 12, also includes a transverse manually set key notch cut positioner having a belt and pulley structure.

14. The fast feed for a code key cutting machine of claim 13, wherein there is a drive advantage in the range of three-five to one from a larger pulley through a belt to a smaller pulley through said belt and pulley structure.

15. The fast feed for a code key cutting machine of claim 13, wherein there is a drive advantage in the range of four to one from a larger pulley through a belt to a smaller pulley through said belt and pulley structure.

16. The fast feed for a code key cutting machine of claim 15, wherein a hand crank is mounted in the larger of said pulleys.

17. The fast feed for code key cutting machine of claim 14, wherein a hand crank is mounted on the larger of said pulleys.

18. The fast feed for a code key cutting machine of claim 14, wherein said belt and pulley structure includes an arm mounting said larger pulley; and a bracket fastened to the machine frame mounting said arm; and belt tensioning means mounted in said bracket engaging said arm.

19. The fast feed for a code key cutting machine of claim 18, wherein said belt tensioning means is a set screw adjustable in a threaded opening bearing against said arm for adjusting the angle of said arm and the tension of said belt.

* * * * *